(12) United States Patent
Wade et al.

(10) Patent No.: US 9,675,910 B1
(45) Date of Patent: Jun. 13, 2017

(54) APPARATUS AND METHOD FOR CLEANING OF SWIMMING POOL AND SPA CARTRIDGE FILTERS

(71) Applicants: Robert Louis Wade, Driftwood, TX (US); David W. Benson, Willis, TX (US)

(72) Inventors: Robert Louis Wade, Driftwood, TX (US); David W. Benson, Willis, TX (US)

( * ) Notice: Subject to any disclaimer, the term of this patent is extended or adjusted under 35 U.S.C. 154(b) by 0 days.

(21) Appl. No.: 13/787,207

(22) Filed: Mar. 6, 2013

Related U.S. Application Data

(60) Provisional application No. 61/607,491, filed on Mar. 6, 2012.

(51) Int. Cl.
| | | |
|---|---|---|
| *B01D 29/00* | (2006.01) | |
| *B01D 35/16* | (2006.01) | |
| *B08B 9/032* | (2006.01) | |
| *B08B 9/093* | (2006.01) | |
| *B08B 9/023* | (2006.01) | |
| *B01D 29/64* | (2006.01) | |

(52) U.S. Cl.
CPC ......... *B01D 29/0077* (2013.01); *B01D 29/64* (2013.01); *B01D 35/16* (2013.01); *B08B 9/023* (2013.01); *B08B 9/032* (2013.01); *B08B 9/093* (2013.01)

(58) Field of Classification Search
None
See application file for complete search history.

(56) References Cited

U.S. PATENT DOCUMENTS

| | | | | |
|---|---|---|---|---|
| 3,998,656 | A * | 12/1976 | Grotto ................ | B08B 5/04 134/153 |
| 4,299,245 | A * | 11/1981 | Clapper ............... | B08B 3/02 118/318 |
| 4,668,384 | A | 5/1987 | Holman | |
| 5,135,580 | A * | 8/1992 | Cantrell et al. ............ | 134/22.11 |
| 5,268,095 | A * | 12/1993 | Barzuza ....................... | 210/143 |
| 533,065 | A | 7/1994 | Bradley | |
| 5,384,045 | A | 1/1995 | Chmielewski et al. | |
| 5,989,419 | A * | 11/1999 | Dudley et al. .......... | 210/167.14 |
| 6,152,155 | A | 11/2000 | Milligan | |

(Continued)

FOREIGN PATENT DOCUMENTS

IT    EP 0993853    A2 *    4/2000    ............. B01D 29/41

OTHER PUBLICATIONS http://www.amazon.com/Blaster-3000-Automatic-Cartridge-Cleaner/dp/BO02WKKA9W.

*Primary Examiner* — Michael Kornakov
*Assistant Examiner* — Pradhuman Parihar
(74) *Attorney, Agent, or Firm* — Rick B. Yeager

(57) ABSTRACT

A cartridge filter cleaning device sprays water onto the outside of a cartridge filter as a nozzle array is moved with respect to the longitudinal axis of the filter as the filter is rotated. In an electric version, a DC motor drives a threaded rod to provide nozzle array movement, and a drive belt to rotate the cartridge filter. In a fluid-driven version, a pump provides fluid pressure for the cartridge filter rotation and nozzle array movement. Multiple cartridge filter embodiments use a single motor or pump to rotate the cartridge filters and move the nozzle array. The nozzle array provides a single nozzle or a plurality of spaced-apart nozzles for each filter. Filter orientation may be vertical, horizontal, or angled.

4 Claims, 15 Drawing Sheets

(56) References Cited

U.S. PATENT DOCUMENTS

| | | | |
|---|---|---|---|
| 6,156,213 | A | 12/2000 | Dudley et al. |
| 7,828,963 | B1 | 11/2010 | Neibert et al. |
| 7,828,964 | B1 | 11/2010 | Neibert |
| 2002/0011259 | A1 | 1/2002 | Pociask |
| 2002/0189988 | A1* | 12/2002 | Alexander et al. ........... 210/169 |
| 2004/0004035 | A1* | 1/2004 | Leckal .......................... 210/169 |
| 2004/0047675 | A1 | 3/2004 | Bonelli et al. |
| 2004/0149318 | A1 | 8/2004 | Su |
| 2007/0266859 | A1* | 11/2007 | Valenzi ........................... 96/233 |
| 2012/0055887 | A1* | 3/2012 | Love ............................. 210/798 |

\* cited by examiner

APPARATUS AND METHOD FOR CLEANING OF SWIMMING POOL AND SPA CARTRIDGE FILTERS

This is a US. Non-Provisional Patent Application which is related to U.S. Provisional Patent Application No. 61/607,488 filed Mar. 6, 2012, and to U.S. Provisional Patent Application No. 61/607,491 filed Mar. 6, 2012, and claims the benefit of the Mar. 6, 2012 filing dates.

FIELD OF INVENTION

The current invention is for a method and apparatus for automated cleaning of swimming pool and spa cartridge filters.

BACKGROUND

Prior Art

Swimming pools and spas require filtration. Cartridge filters are a preferred method of filtration, but must be cleaned, usually manually with a hose and spray. Various devices exist to clean or assist in cleaning filters, but most require laborious effort by the pool owner or pool caretaker. Some devices do not facilitate cleaning of various sizes of cartridges. The present invention minimizes the effort necessary to clean cartridges and provides a more effective method of filter cleaning. Some prior art devices use water pressure and the same flow path for cleaning and for rotating the filter, thus decreasing the effectiveness of those devices.

The prior art includes various attended and non-attended filter cartridge cleaning devices.

U.S. Pat. No. 5,384,045 to Chmielewski, et al., describes journaling a swimming pool filter for rotation about a vertical array of nozzles and spun about a vertical axis by the action of the spray. The rotation can be fast enough that centrifugal forces aid in the cleaning operation by sloughing dirt off the outside of the filter. One version of the apparatus includes a second vertical array of nozzles external to the filter and directing a spray against the outer face of the filter, which aids in sloughing dirt off it. This second array is rotatable about its own vertical axis and can be used to control the rate of rotation of the filter being cleaned. A sealed bearing is provided at the base of the filter to allow free rotation about the first vertical array of nozzles. FIG. 1 is an example of a prior art Chmielewski device.

U.S. Pat. No. 7,828,964 to Neibert describes a pool filter cleaner device for simultaneously cleaning the interior and exterior surfaces of a conventional cylindrical pool filter. The pool filter cleaner includes first and second elongated pipes, each having an upper end and a lower end. A hose connector provides fluid connection between an external hose, the upper end of the first elongated pipe and a first end of a cross pipe. A second end of the cross pipe is in fluid communication with the upper end of the second elongated pipe. A sprinkler head is mounted on the lower end of the first elongated pipe, and a nozzle is mounted on the lower end of the second elongated pipe. A cap is slidably mounted on the first elongated pipe, the cap being adapted for covering and sealing an upper opening of the pool filter when the sprinkler head is inserted within the pool filter. FIG. 2 is an example of a prior art Neibert device.

FIG. 3 is a "Blaster 3000 Automatic Pool and Spa Cartridge Filter Cleaner". Applicant assumes, but has not confirmed, that this is a prior art device.

The prior art also includes various wands, stands, and nozzles to facilitate cartridge cleaning with a garden hose. In this specification, devices that require the presence of a person during cleaning are termed "attended devices". FIGS. 1-3 represent "non-attended devices" where the presence of a person is not required during the cartridge cleaning process.

SUMMARY OF THE INVENTION

The present invention is related to improved methods and devices for the non-attended cleaning of cartridge filters, including pool filters, spa filters, and other types of filters.

In one single cartridge filter embodiment, a DC electric motor is used to turn the filter while a nozzle array comprising a single angled jetted nozzle moves from the top to the bottom of the filter. The relatively high pressure and/or flow rate of the single nozzle permits an effective cleaning of the filter. The single cartridge device can accommodate either a single long cartridge or two or more stacked shorter cartridges such as spa filters. The pool owner or pool cleaner loads a cartridge and turns on the device. In other examples the nozzle array comprises two more spaced apart nozzles.

In another multiple cartridge filter embodiment, a single DC electric motor is used to turn up to four filters while driving a nozzle array with respect to the rotating filters. The nozzle array provides one or more nozzle for each filter. In a vertical orientation of the filters, the nozzle array moves from the top to the bottom of the filters. Each cartridge position can accommodate either a single long cartridge or two or more stacked shorter cartridges such as spa filters. The pool owner or pool cleaner loads the filters and turns on the device. The motor stops automatically when the nozzle array has reached the bottom of the filters.

In other embodiments, the single or multiple cartridge filters are rotated while in a horizontal or angled orientation, and the nozzle array is moved with respect to the longitudinal axis of the cartridge filters.

In other embodiments, a booster pump is used to provide a high pressure water that drives the cartridge rotation, drives the nozzle array, and provides water pressure to a plurality of nozzles in the nozzle array.

The nozzle array may comprise nozzles of different spray patterns, such as a directed flow to dislodge debris from the filter, and a broader cone or flat spray pattern to wash debris away from the filter.

In various embodiments, the water supply may be provided from a garden hose or from a pump supplied by a supply reservoir, recirculation tank, or swimming pool. Waste water may flow onto the ground, such as to irrigate a lawn or landscape, or may be filtered and returned to a swimming pool. The water supply to the nozzle array may include the addition of one or more cleaning and disinfectant agents.

BRIEF DESCRIPTION OF THE DRAWINGS

The following drawings are illustrative of embodiments of the invention and are not meant to limit the scope of the invention as encompassed by the claims.

DESCRIPTION OF EMBODIMENT—SINGLE FILTER CARTRIDGE CLEANING DEVICE

Figure 2:
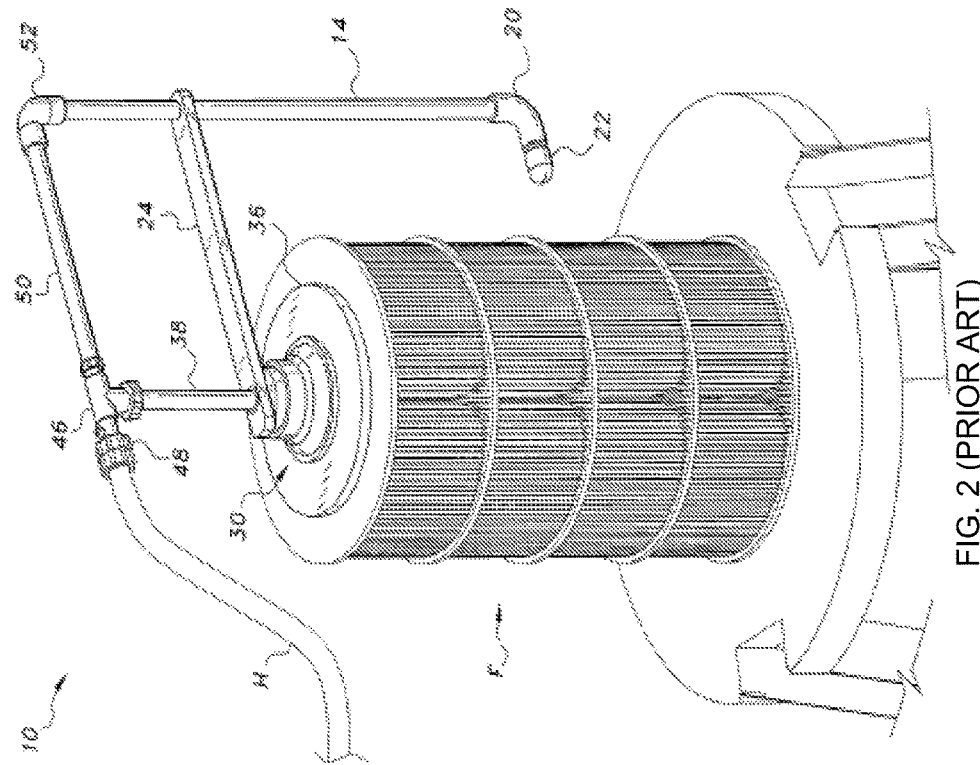
FIG. 2 is a side perspective view of a prior art device of U.S. Pat. No. 7,828,964.
Figure 1:
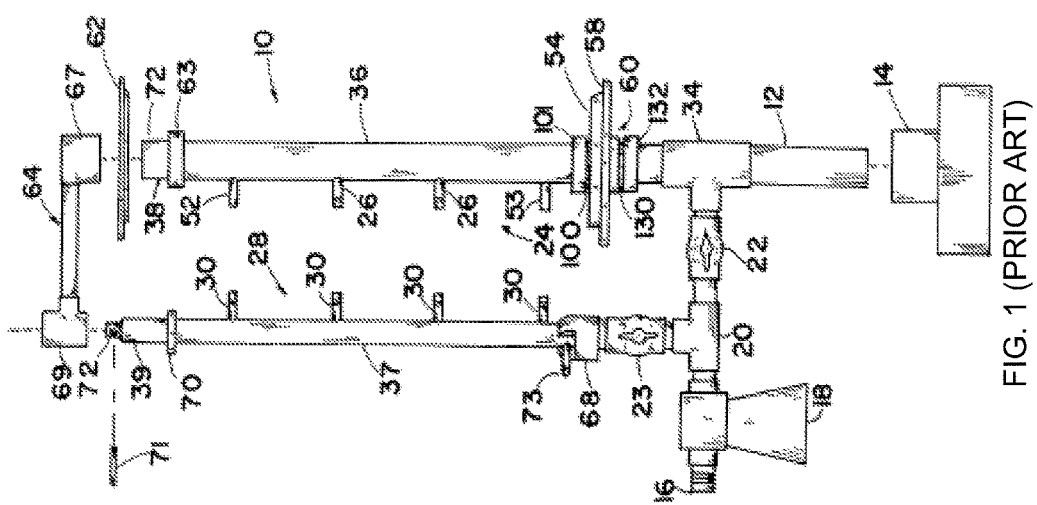
FIG. 1 is a side view of a prior art device of U.S. Pat. No. 5,384,045.
Figure 3:
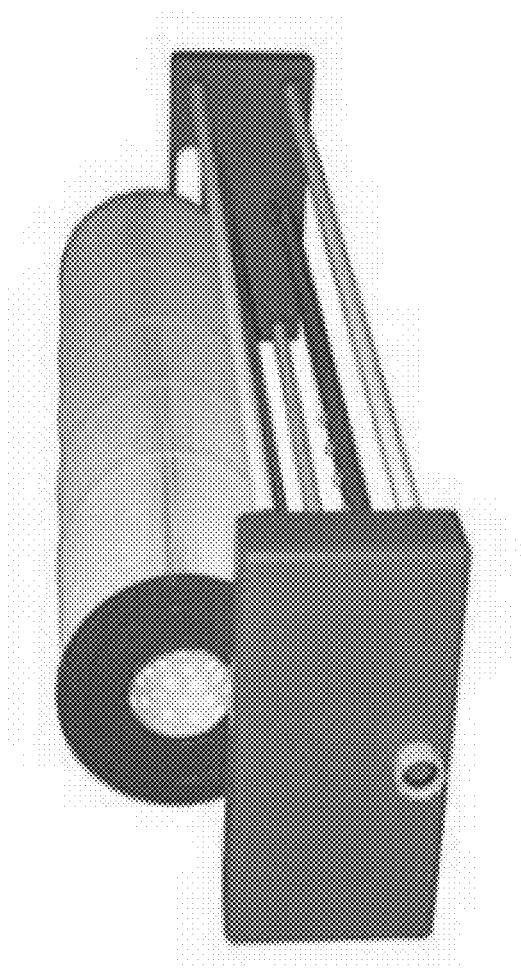
FIG. 3 is a side perspective view of a prior art device.

In this specification, the terms "filter", "cartridge filter", and "cartridge" mean cylindrical filter elements for use in swimming pools, spas, and other applications. The filters have an annular inside opening and an "outside surface" which is typically pleated. The "longitudinal axis" of the filter is through the annular opening.

In this specification, the term "cartridge rotating support" means an element for holding a cartridge filter or a stack of two or more cartridge filters so that a filter may be rotated about its longitudinal axis.

In this specification, the term "cartridge rotating support drive element" means an element for causing the rotation of one or more cartridge rotating support, including, but not limited to a motor-driven pulley or gear, a fluid driven pulley or gear, and a manually driven pulley or gear.

In this specification, the term "pressurized water source" includes, but is not limited to, a garden hose or are a pump which provides water from a source such as reservoir, a swimming pool, or a recirculation tank.

In this specification, the term "nozzle" means an element to create a directed or patterned fluid stream.

In this specification, the term "nozzle array" means one or more nozzles in fluid communication with a pressurized water source.

The following element numbers are shown in the drawings and shown here for convenience.

motor-driven embodiments
single cartridge filter cleaner 5
horizontally-oriented single cartridge filter cleaner 6
acute angled single cartridge filter cleaner 7
vertically-oriented two filter cartridge cleaner 8
filter cartridge filter 10, 10a, 10b, 10c, 10d
cartridge rotating support 15, 15a, 15b
cartridge rotating support drive element 20, 20a, 20b, 20c, 20d
pulley 42
belt 43
nozzle array 30
  pressurized nozzles 32, 32a, 32b, 32c, 32d
  nozzle array support drive element 60
    drive shaft bearing assembly 65
  electric DC motor 40
  frame 50
fluid-driven embodiments
fluid powered vertically-oriented two filter cartridge cleaner 9
  pump 80
  reservoir 81
  pressurized tank 82
  cartridge rotating support drive element 64
  cartridge rotating support drive elements 62a and 62b
  flow path 87, 86a, 86b
  piping or tubing 85a, 85b, 84
  flow paths 86a and 86b
example single cartridge filter device 100
  frame and housing
    PVC lower frame pipe 121
    PVC lower frame extension (1") 124
    PVC pipe cap (1") 125
    PVC tee (1") 117
    wheel 116
      wheel axle 118
    PVC spray nozzle drive guide (1") 108
    PVC Elbow (1") 107
    PVC pipe connector (1") 106
    spray nozzle guide bushing 112
  angle brace 150
  motor and drive assembly
  motor housing shroud 101
  12 volt DC motor 102
    motor on/off switch 104
    110 volt AC to 12 volt DC power supply 132
    safety shutdown switch 113
  motor bracket 103
  all thread drive shaft bearing assembly 105
  all thread shaft 109
  half nut assembly 110
  drive shaft pulley 119
  drive belt 120
  spray nozzle drive housing 111
  piping
    PVC spray nozzle water connection (¾") 126
  PVC spray nozzle pipe (½") 127
  angled spray nozzle 128
  spray nozzle reducing plug 131
  garden hose connection 141
  cartridge filter holder and rotation
  cartridge filter rotating disc assembly 114
  cartridge filter rotating disc bearing assembly 122
  cartridge filter rotating disc pulley 123
  cartridge drive shaft assembly 115
  cartridge filter securing shaft 129
  cartridge filter spin down securing nut 130
four cartridge filter device 200
  frame 201
    spray nozzle drive guide 208
    angle brace 250
  motor and drive assembly 12 volt DC motor 202
all thread shaft 209
drive shaft pulleys 219*a*, 219*b*
drive belts 220*a*, 220*b*
piping
spray nozzle array 260
spray nozzles 228*a*, 228*b*, 228*c*, 228*d*,
cartridge filters holder and rotation
cartridge rotating disc assembly 214*a*, 214*b*, 214*c*, 214*d*
cartridge rotating disc pulley 223*a*, 223*b*, 223*c*, 223*d*

In this single cartridge filter cleaning device embodiment, a cartridge filter is mounted on a cartridge rotating support and the cartridge rotating support is rotated by a cartridge rotating support drive element. In one example, the cartridge rotating support drive element is motor-driven. In another example, the cartridge rotating support drive element is fluid-driven, where pressurized fluid is provided by a pump. In this embodiment, the motor permits a slow and controlled rotation of the filters without diminishing available water pressure, thereby permitting higher pressure supply to the nozzle(s).

As the cartridge filter is rotated, a nozzle array subassembly comprising one or more pressurized nozzles mounted on a nozzle array support is driven in a direction parallel to the longitudinal axis of the filter cartridge. Water is provided from a pressurized water source such as a garden hose or reservoir and recirculation pump, and sprayed on the outside surface of the filter. The nozzle(s) provide directed water flow and pressure to penetrate between pleats on filter surface in order to remove debris from the outside of the filter. In some examples, a single nozzle is provided. In other examples, two or more nozzles are provided and are oriented axially or longitudinally with respect to the cartridge filter.

In one example, the cartridge filter is supported in a vertical orientation. In other examples, the cartridge filter is supported in a horizontal orientation or an angled orientation with respect to the ground.

Figure 4:
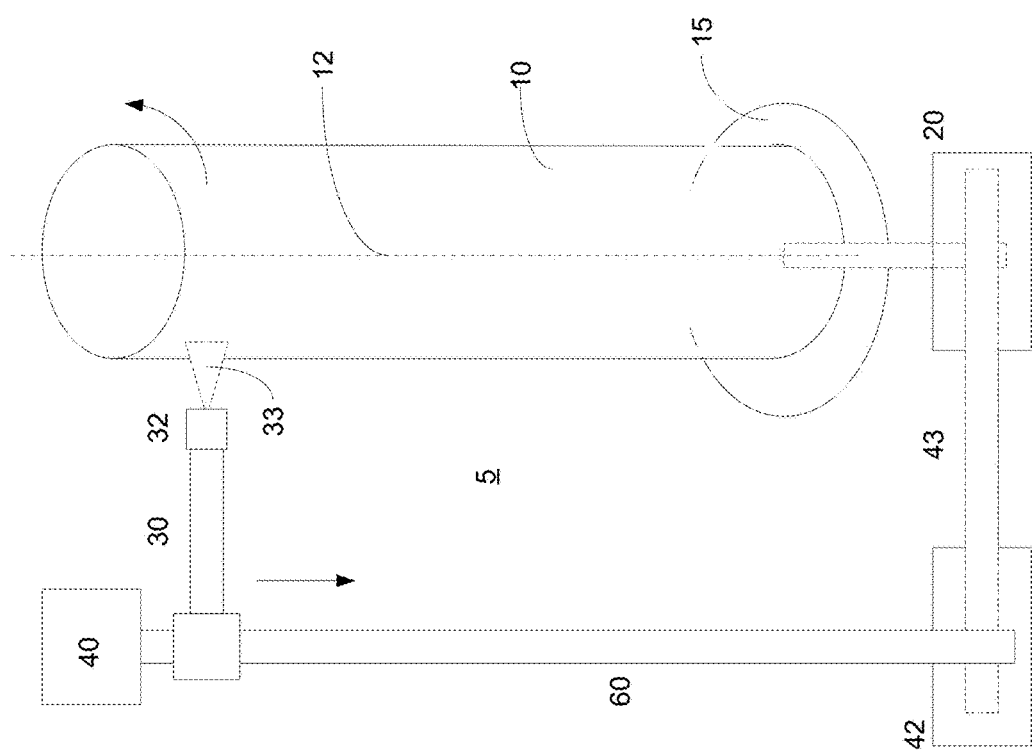
FIG. 4 is a schematic of a vertically-oriented single filter cartridge cleaner.

FIG. 4 is a schematic of a vertically-oriented single cartridge filter cleaner 5. In this embodiment, a cartridge filter 10 is mounted on a cartridge rotating support 15 so that the filter's longitudinal axis 12 is vertically-oriented. The cartridge rotating support 15 is rotated by a cartridge rotating support drive element 20, thereby rotating the filter about its longitudinal axis 12. As the filter is rotated, a nozzle array 30 is supported by a nozzle array support (not shown) and moved parallel to the longitudinal axis of the filter, and water or a mixture of water and cleaning or disinfectant agents is provided from a pressurized water source (not shown) and directed at the filter by one or more pressurized nozzles 32 in the nozzle array which direct a water spray at the outside of the filter. One or more nozzle spray patterns are provided to penetrate pleats on the filter in order to dislodge debris, and to wash debris away from the filter. The nozzle array is driven by a nozzle array support drive element 60, such as a fluid-driven or motor-driven threaded rod. In one example, an electric DC motor 40 drives a threaded rod which is the nozzle array support drive element 60, which causes the nozzle array to be driven along the threaded rod; and the threaded rod also drives a pulley 42 and belt 43 to turn a pulley which is the cartridge rotating support drive element 20. In other examples the rotational motion of the cartridge rotating support, and the linear motion of the nozzle array is provided by fluid pressure, such as from a pump. In this embodiment, the pump permits filter rotation and good water pressure to the nozzles. In some examples, two or more nozzles are directed at each filter so that the nozzle array drive speed may be increased.

Figure 5:
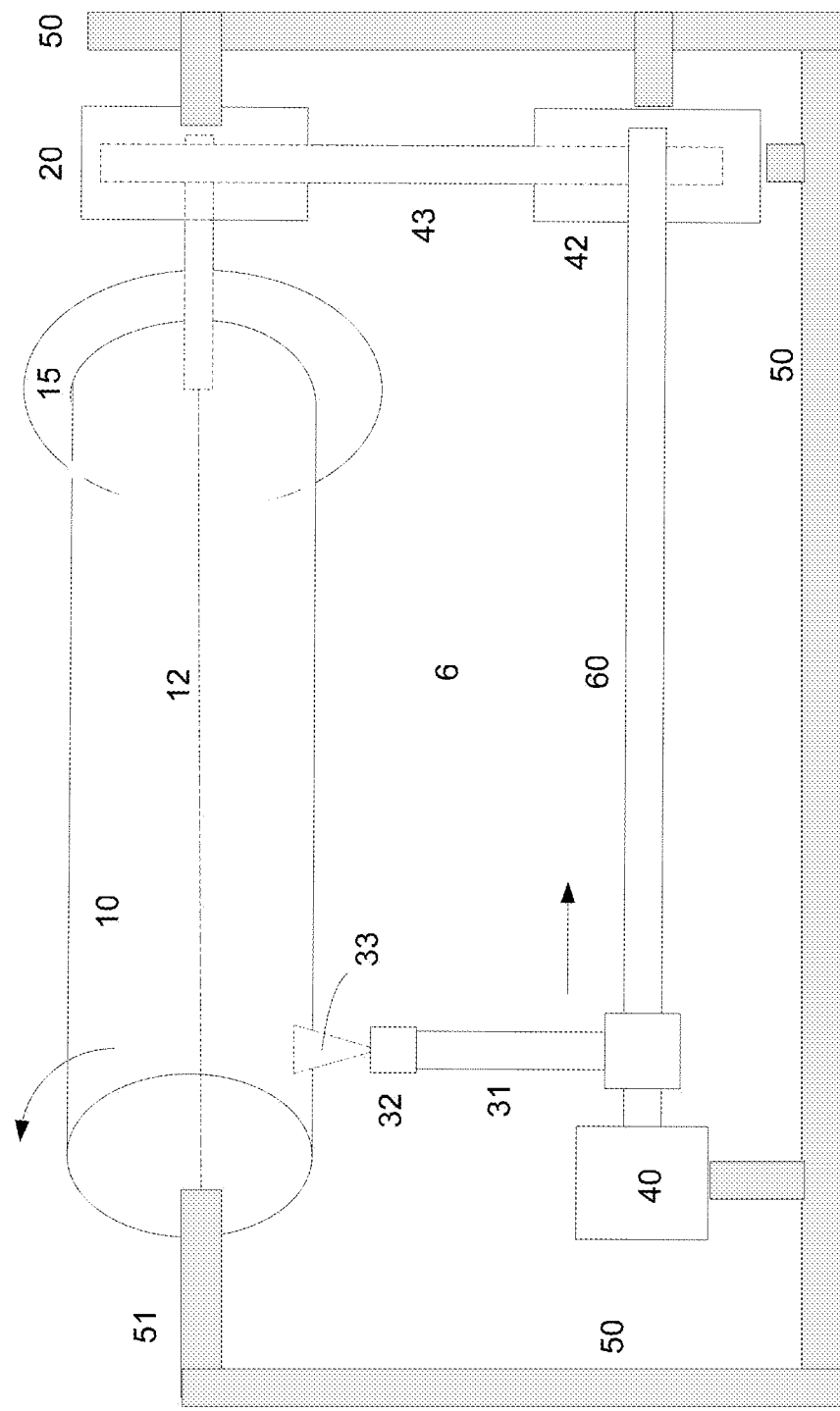
FIG. 5 is a schematic of a horizontally-oriented single filter cartridge cleaner.

FIG. 5 is a schematic of a horizontally-oriented single cartridge filter cleaner 6. In this embodiment, a filter cartridge 10 is mounted with respect to a cartridge rotating support 15 so that the filter's longitudinal axis 12 is horizontally-oriented. The cartridge rotating support 15 is rotated by a cartridge rotating support drive element 20, thereby rotating the filter about its longitudinal axis. As the filter is rotated, a nozzle array 30 is supported by a nozzle array support (not shown) and moved parallel to the longitudinal axis of the filter, and water or a mixture of water and cleaning or disinfectant agents is provided from a pressurized water source and directed at the filter by one or more pressurized nozzles 32 provided in the nozzle array so that the nozzles direct a water spray at the outside of the filter. The nozzle array is driven by a nozzle array support drive element 60, such as a fluid-driven or motor-driven threaded rod. A frame 50, which was not shown in FIG. 5 supports the various elements.

Figure 6:
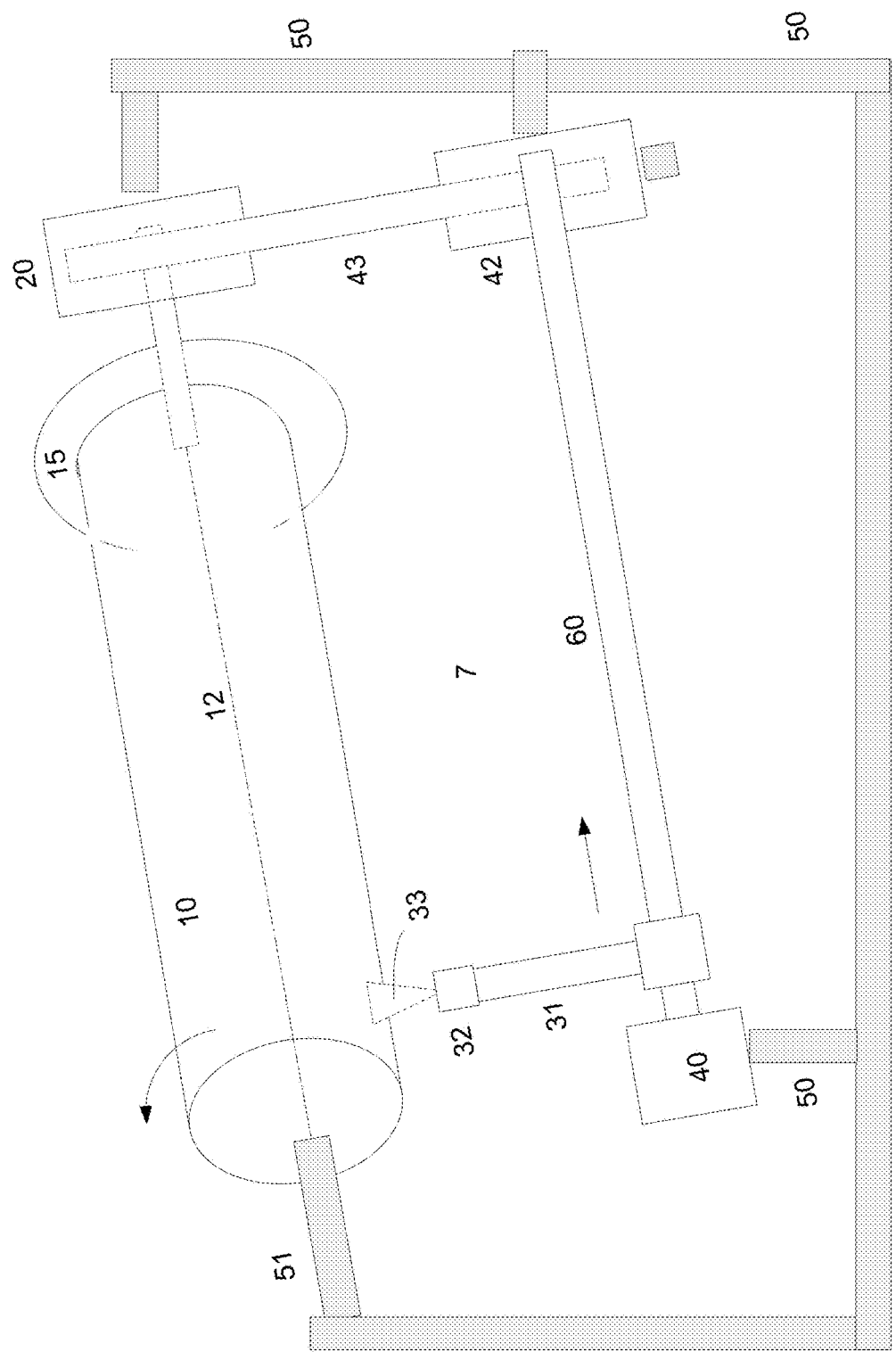
FIG. 6 is a schematic of a single filter cartridge cleaner with the filter oriented at an acute angle with respect to the ground.

FIG. 6 is a schematic of a single cartridge filter cleaner 7 with the filter oriented at an acute angle with respect to the ground. In this embodiment, a cartridge filter 10 is mounted with respect to a cartridge rotating support 15 so that the filter's longitudinal axis 12 is oriented at an acute angle with respect to the ground.

Figure 7:
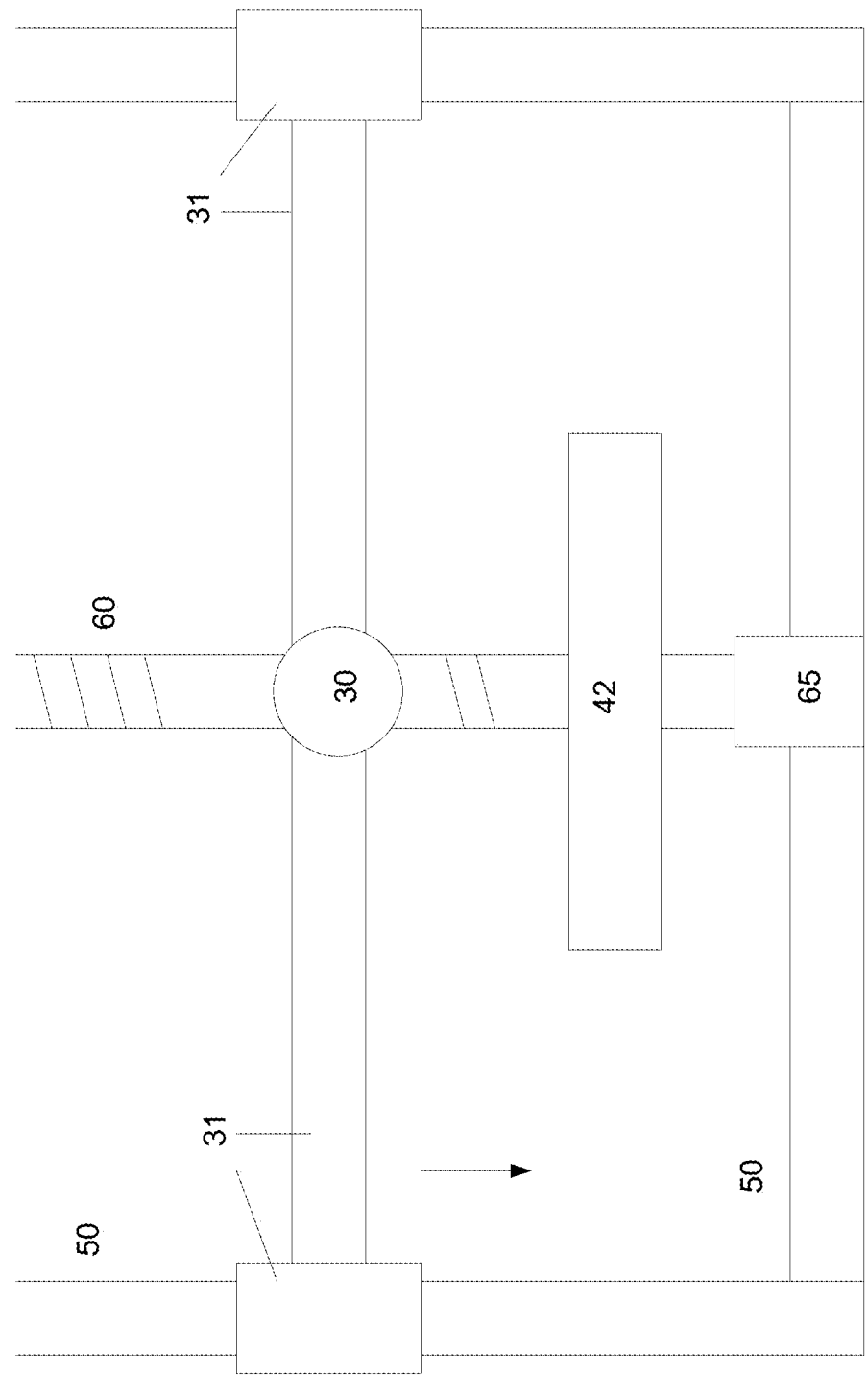
FIG. 7 is a side view of the lower portion of the device of FIG. 4 showing the nozzle array mounted with respect to the support drive element.

FIG. 7 is a side view of the lower portion of the device of FIG. 4 showing the nozzle array mounted with respect to the support drive element 60, which is a threaded rod in this example. The threaded rod turns pulley 42 as described above and is supported by a drive shaft bearing assembly 65. In other examples, other mechanisms may be used to rotate the filter, such as gears, chains, cables, etc. In this example, the nozzle array 30 is supported by a a nozzle array support 31 which includes frame engagement elements for guiding the device relative to parallel members of the frame 50.

Example—Single Filter Cartridge Device with Motor

Figure 8:
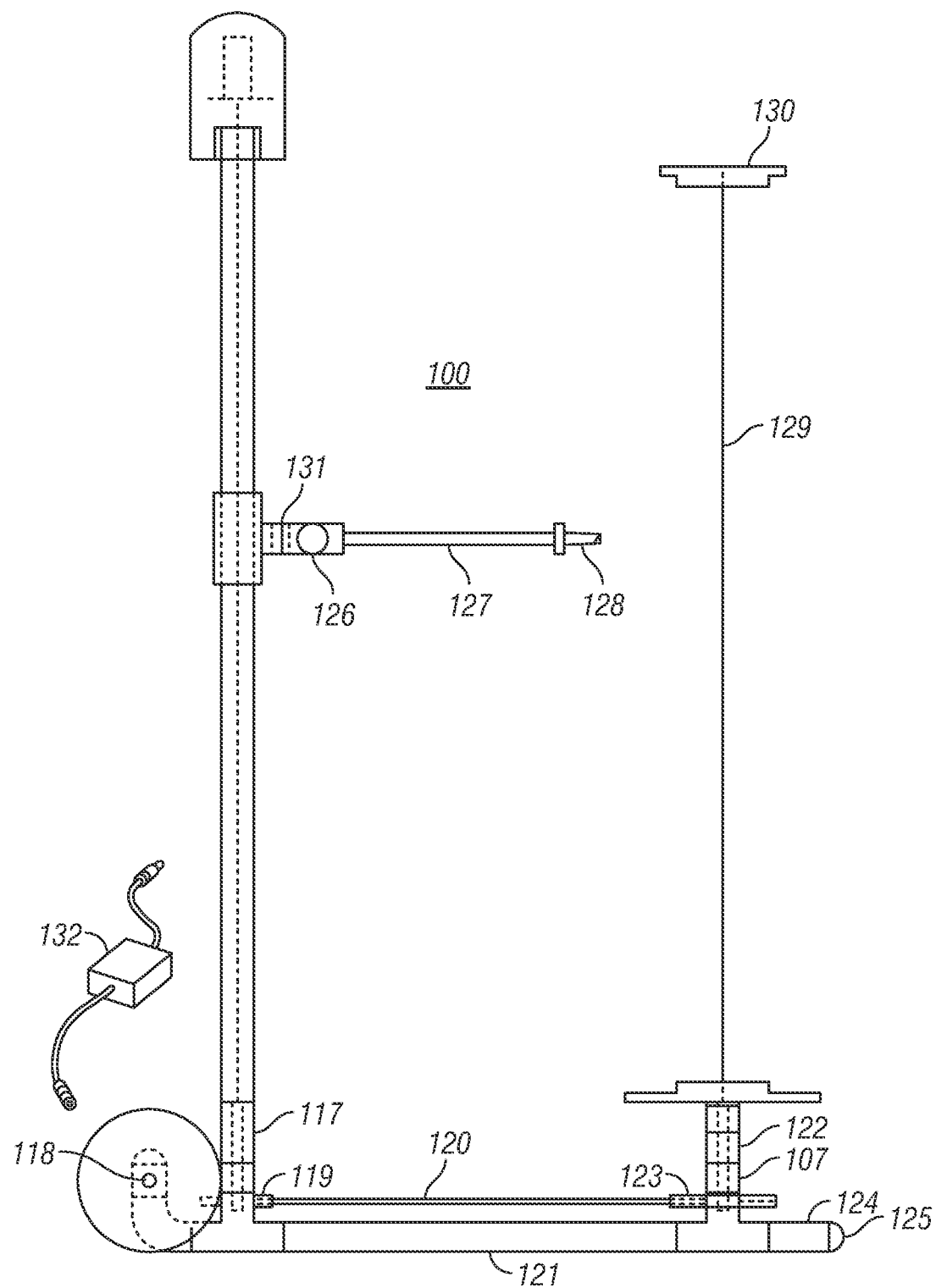
FIG. 8 is a side view of a motor-driven single filter cartridge cleaning device.
Figure 9:
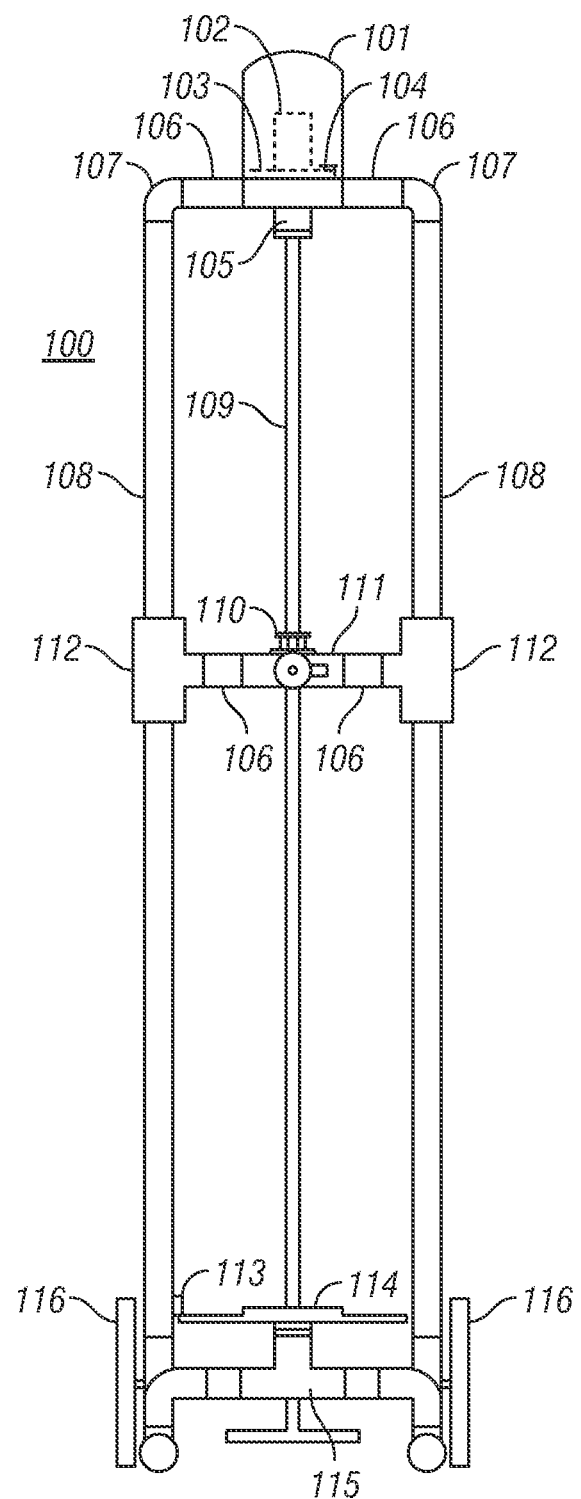
FIG. 9 is a front view of the motor-driven single filter cartridge cleaning device of FIG. 8.
Figure 10:
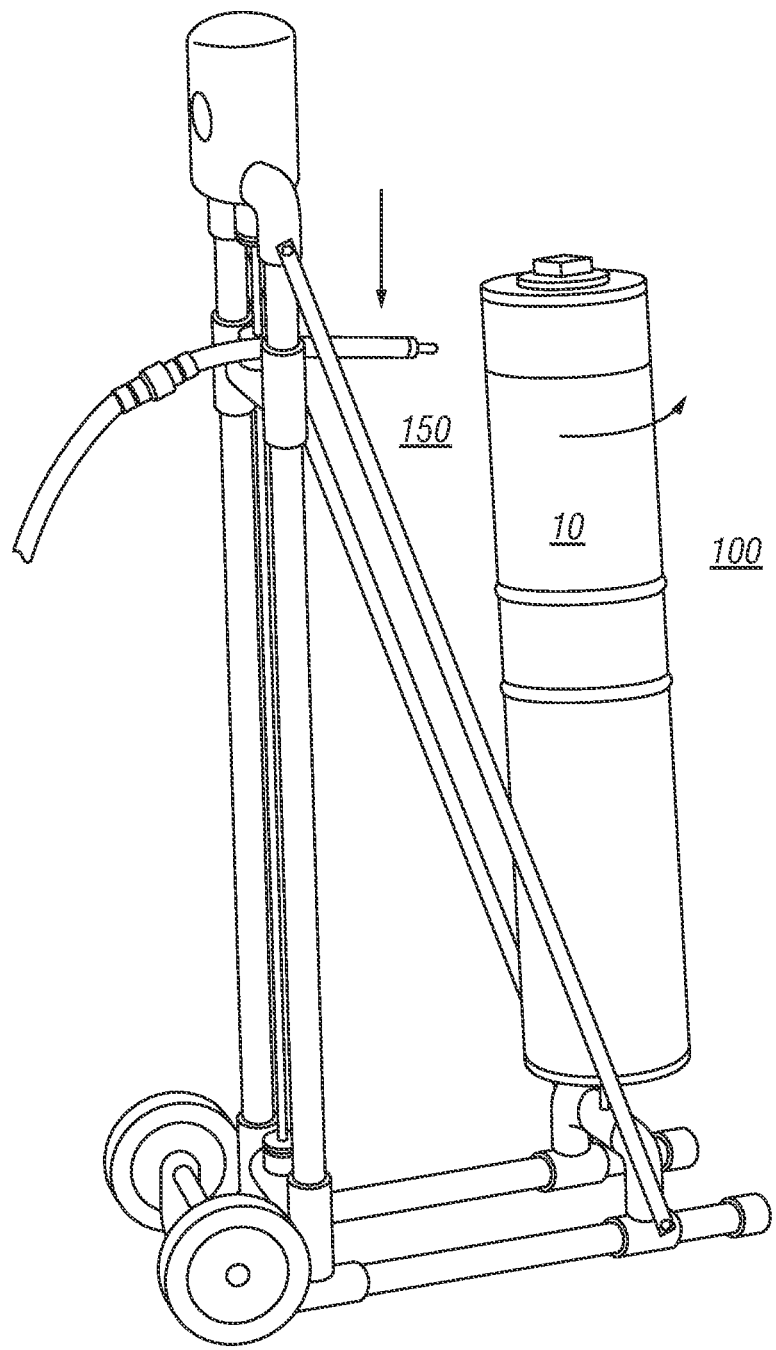
FIG. 10 is a top perspective view of the motor-driven single cartridge filter cleaning device of FIG. 8 showing placement of a filter on the device, with the filter partially cleaned.

FIG. 8 is a side view of a motor-driven single filter cartridge cleaning device 100. FIG. 9 is a front view of the motor-driven single filter cartridge cleaning device of FIG. 8. FIG. 10 is a top perspective view of the motor-driven single filter cartridge cleaning device of FIG. 8 showing placement of a filter on the device, with the filter partially cleaned.

In this example, a PVC frame is provided comprising a PVC lower frame pipe 121, PVC lower frame extension (1") 124, PVC pipe cap (1") 125, PVC tee (1") 117, PVC pipe connector (1") 106, wheels 116, wheel axle 118, and angle brace 150

In this example, a 12 volt DC motor 102 is provided on a motor bracket 103 and protected by a motor housing shroud 101. The motor is operated with a motor on/off switch 104. A 110 volt AC to 12 volt DC power supply 132 provides power to the motor. The motor is shut off by a safety shutdown switch 113 when the cleaning operation is completed. The motor is mounted on motor bracket 103 and turns all thread shaft 109 which is supported by the thread drive shaft bearing assembly 105. Half nut assembly 110 secures the nozzle array to the all thread shaft. The all thread shaft 109 drives drive shaft pulley 119 and drive belt 120.

As the all thread drive shaft is turned, a nozzle array is driven downwardly along the all thread drive shaft which is oriented parallel to the longitudinal axis of the filter cartridge.

In this example, the nozzle array comprises a nozzle array support with a spray nozzle drive housing 111; a ¾" PVC spray nozzle water connection 126; and a ½" PVC spray nozzle pipe 127. In this example, a single angled spray nozzle 128 is provided on the nozzle array.

The nozzle array support comprises spray nozzle guide bushing 112 which travel along a pair of PVC spray nozzle drive guides (1") 108.

A garden hose connection 141 supplies water to the nozzle array which comprises spray nozzle drive housing 111, a PVC spray nozzle water connection (¾") 126, a PVC spray nozzle pipe (½") 127, a spray nozzle reducing plug 131, and an angled spray nozzle 128.

The cartridge filter holder and rotation assembly comprises cartridge filter rotating disc assembly 114 which supports a filter installed over cartridge filter securing shaft 129 and secured with cartridge filter spin down securing nut 130. The cartridge filter rotating disc assembly is turned by the drive belt 120 and cartridge filter rotating disc pulley 123. Cartridge drive shaft assembly 115 includes cartridge filter rotating disc bearing assembly 122.

In this example, the device is open and cleaning water is discharged to the ground. In other examples, a shroud is provided so that the cleaning water may be collected in a sump and drained to a pool; or collected, filtered, and recirculated.

In an example method of using this device, a cartridge filter is removed from a swimming pool or spa filter. The filter, or stack of filters, is are placed over the cartridge securing shaft 129 so that the filter or stacked filters rest on the filter cartridge rotating disc assembly 114, and the filters are secured with the cartridge filter spin down securing nut 130, A water hose is attached at the garden hose connection 141. Water to the unit is turned and and the filter cartridge rotating disc assembly is activated when the motor switch 104 is turned on.

The 110 volt AC to 12 volt DC power supply 132 is plugged into an electrical outlet. The nozzle array is moved to the top of the filter. In this example, the nozzle position is fixed for a standard diameter filter. In other examples the nozzle position may be adjusted so that the nozzle is at a desired distance from the filter. The motor on/off switch 104 is turned on so that the filter begins to rotate and the nozzle array begins traveling down the all thread shaft 109.

The spray nozzle drive housing 111 travels down the all thread shaft 109 guided by two 1 inch PVC spray nozzle drive guides 108 as it sprays water through the angled spray nozzle 128, thus cleaning the filter. As the angled spray nozzle 128 reaches the bottom of the filter, it triggers the safety shutdown switch 113 and the filter ceases to rotate. In this example, the water is shut off manually. In other examples, a solenoid on a shutoff valve may be wired to the motor on/off switch to turn the motor and water on and off at the same time. Any additional filters can be cleaned by repeating the process.

DESCRIPTION OF EMBODIMENT—MULTIPLE FILTER CARTRIDGE CLEANER WITH SINGLE MOTOR

In this embodiment, multiple cartridge rotating supports are rotated by an electric motor while a nozzle array is driven by the motor.

Figure 11:
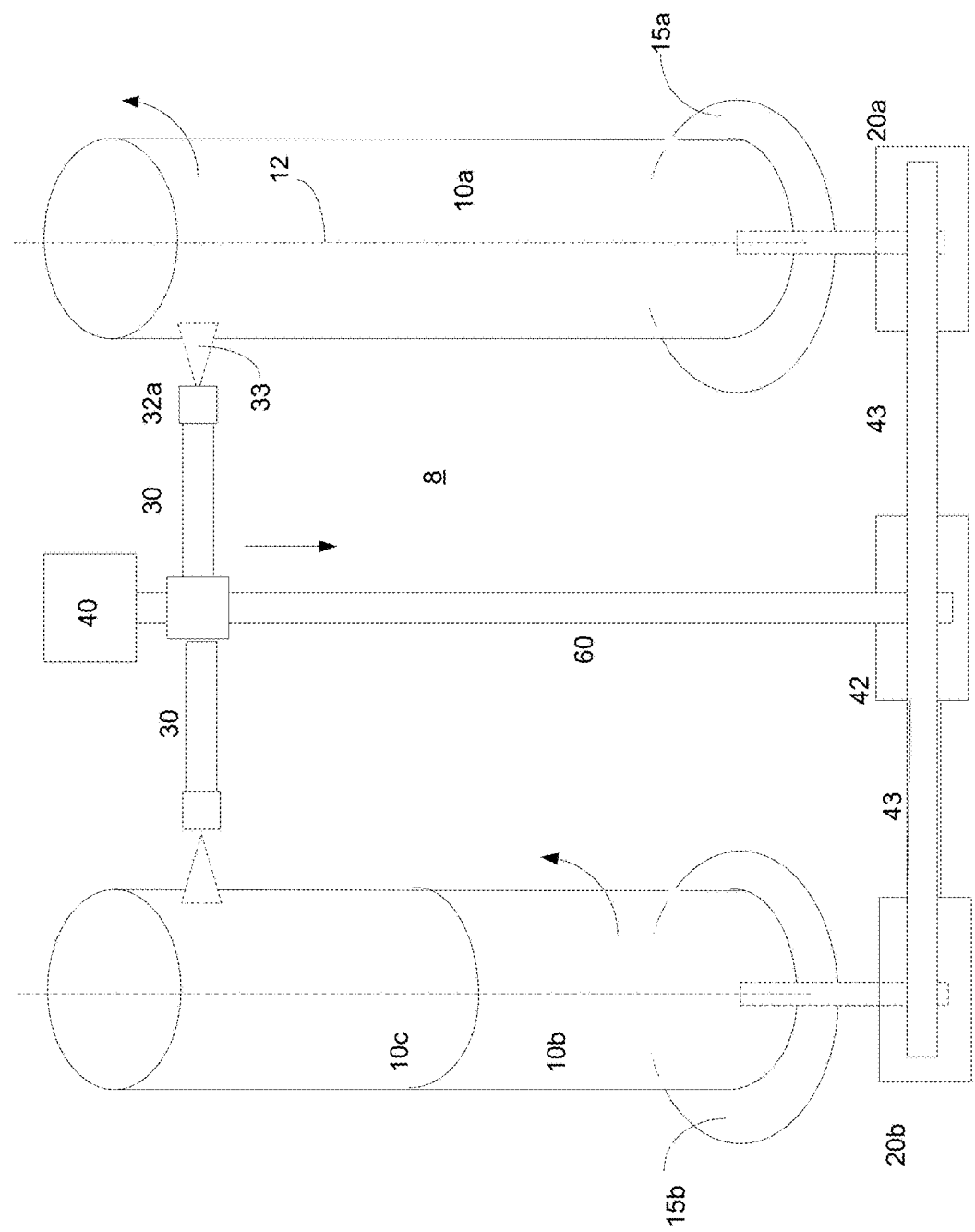
FIG. 11 is a schematic of a vertically-oriented two filter cleaner.

FIG. 11 is a schematic of a vertically-oriented two cartridge filter cleaner 8. In this embodiment, cartridge filters 10a and 10b are mounted on a cartridge rotating supports 15a and 15b so that the filters' longitudinal axes 12 are vertically-oriented. The cartridge rotating supports are rotated by cartridge rotating support drive elements 20a and 20b, thereby rotating the filters about their longitudinal axes. As the filters are rotated, a nozzle array 30 is supported by a nozzle array support (not shown) and moved parallel to the longitudinal axes of the filters, and water or a mixture of water and cleaning or disinfectant agents is provided from a pressurized water source (not shown) and directed at the filter by a pressurized nozzles 32a and 32b in the nozzle array which direct a water spray at the outside of each filter. One or more nozzle spray patterns are provided to penetrate pleats on the filters in order to dislodge debris, and to wash debris away from the filters. The nozzle array is driven by a nozzle array support drive element 60, such as a fluid-driven or motor-driven threaded rod. In one example, an electric DC motor 40 drives a threaded rod which is the nozzle array support drive element 60, which causes the nozzle array to be driven along the threaded rod; and the threaded rod also drives a pulley 42 and belt 43 to turn a pulley for each cartridge rotating support drive element 20a and 20b. In other examples the rotational motion of the cartridge rotating support, and the linear motion of the nozzle array is provided by fluid pressure, such as from a pump.

Figure 12:
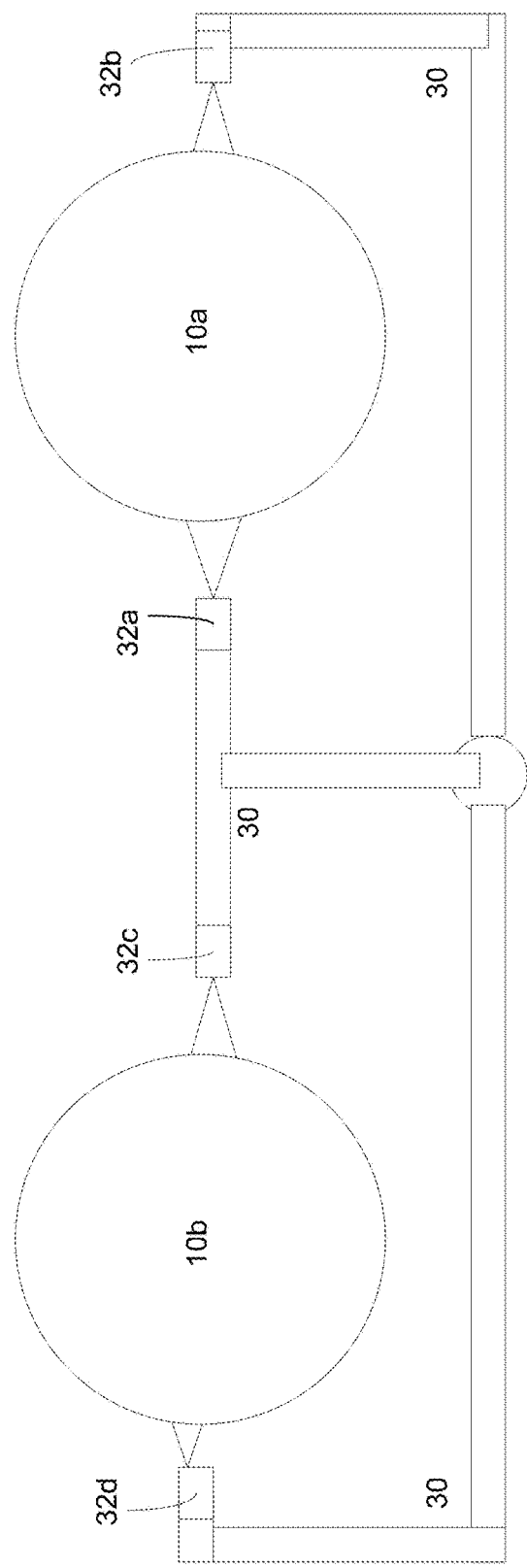
FIG. 12 is a top view of a nozzle array with two nozzles directed at each of two filters.

FIG. 12 is a top view of a air of filters 10a and 10b, and nozzle array 30 which has a first pair of nozzles 32a and 32b directed at filter 10a, and a second pair of nozzles 32c and 32d directed at filter 10b. In other examples, the nozzle array 30 may provide 3 or more nozzles for each filter. In FIG. 12, the nozzle array provides two or more nozzles in a plane orthogonal to the longitudinal axis of each filter. In other examples, two or more nozzles may be provided parallel to the longitudinal axis of each filter; or a plurality of nozzles may be provided in both a plane orthogonal to the longitudinal axis of each filter and parallel to the longitudinal axis of each filter. In the latter examples, a variety of spray patterns may be provided, such as providing a directed stream in the lower nozzle(s) to dislodge debris, and a fan pattern in upper nozzles to wash dislodged debris away from the filters.

Example—Four Filter Cartridge Cleaner with Single Motor

FIGS. 14-17 show an example multiple cartridge filter cleaner 200 in a vertical orientation where a single electric motor 202 drives filter rotation and nozzle array movement.

Figure 14:
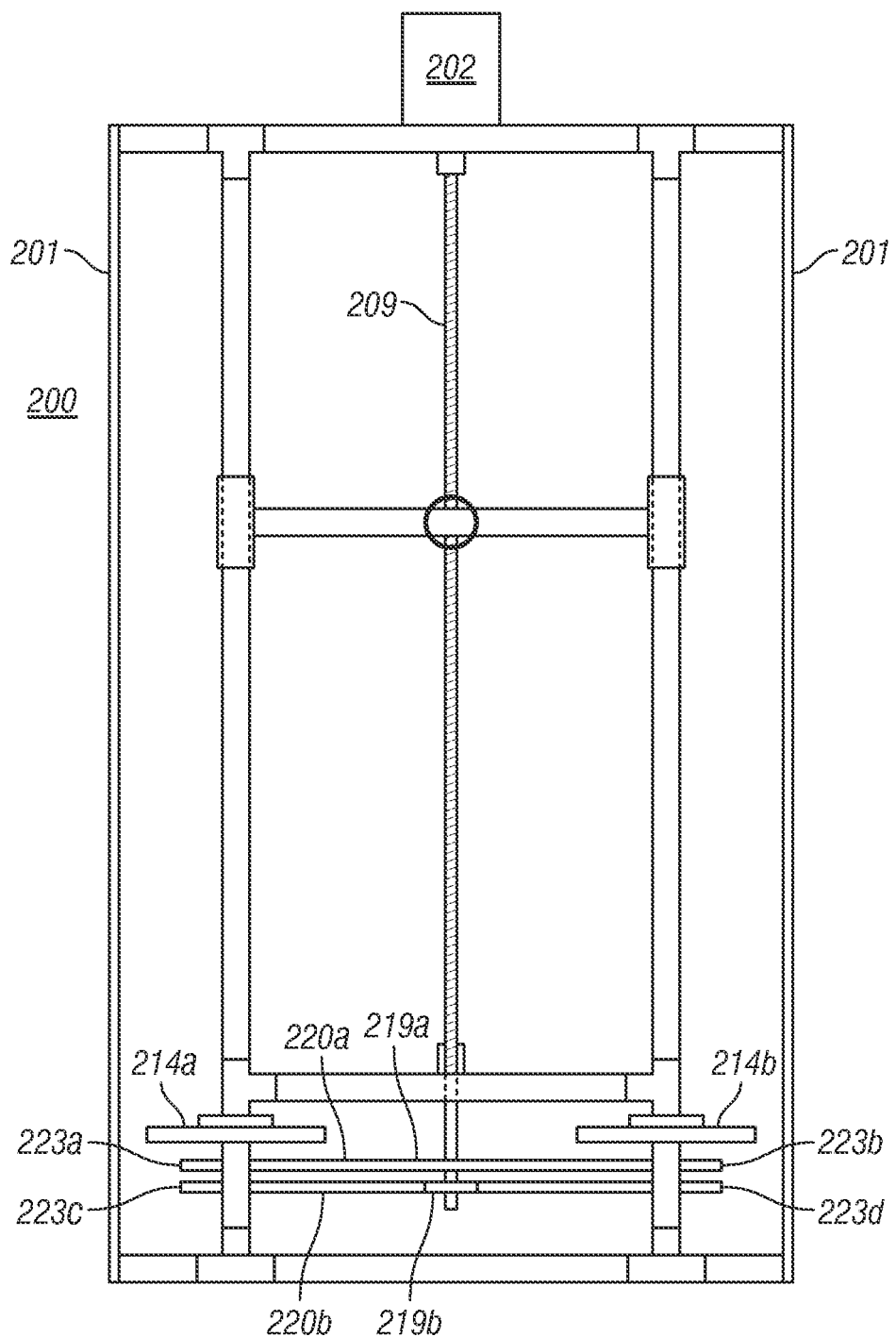
FIG. 14 is a front view of an example multiple filter cartridge cleaning embodiment where the nozzle array is not shown.

FIG. 14 is a front view of an example multiple cartridge filter cleaning embodiment where the nozzle array is not shown. In this example, a frame 201 supports a 12 volt DC motor 202, which drives an all thread shaft 209 which drives the nozzle array (not shown) and drive shaft pulleys 219a and 219b.

Drive belts 220a and 220b rotate cartridge rotating disc pulleys 223a, 223b, 223c, and 223d and cartridge rotating disc assemblies 214a, 214b, 214c, and 214d. A motor switch, 12 volt DC power source, and cutoff switch are provided as described in the single cartridge filter cleaning example described above.

Figure 15:
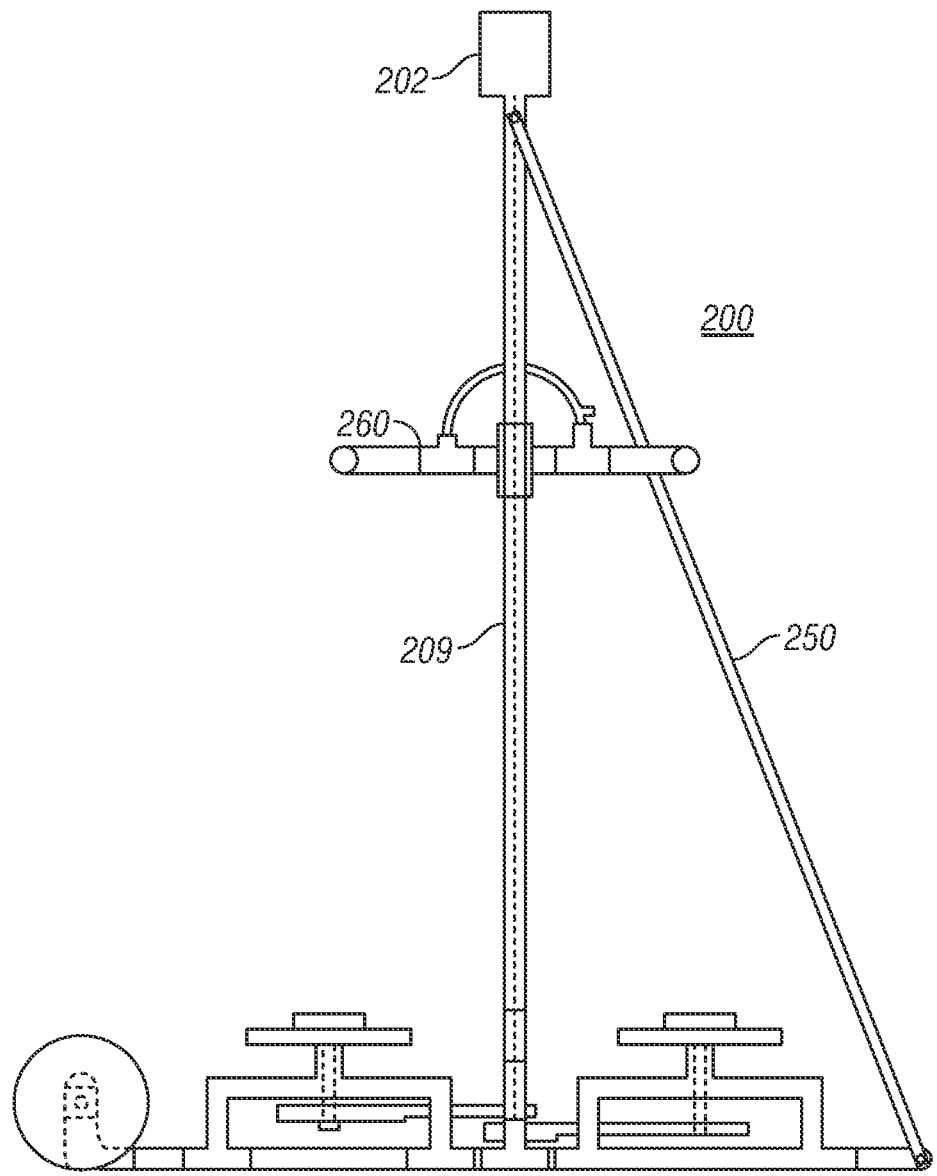
FIG. 15 is a top view of the belt drive assembly of the four filter cartridge cleaning embodiment of FIG. 14.

FIG. 15 is a side view of the example four cartridge filter cleaning embodiment of FIG. 14. where the nozzle array is not shown. This view shows the motor 202, which drives the all thread shaft 209. The spray nozzle array 260 moves in a downward direction parallel to the longitudinal axis of the filters as the all thread shaft is rotated by the motor. The all thread shaft drives the drive shaft pulleys 219a and 219b (not shown). The frame includes angle brace 250.

Figure 16:
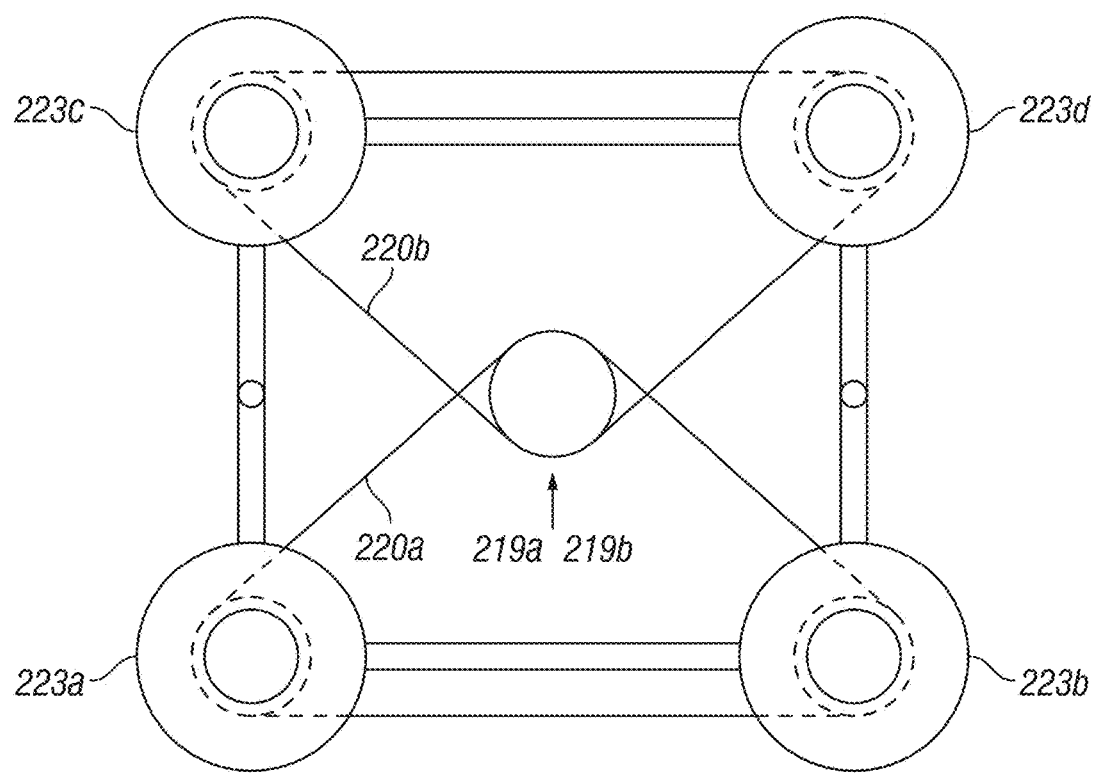
FIG. 16 is a side view of the example four filter cartridge cleaning embodiment of FIG. 14.

FIG. 16 is a top view of the belt drive assembly of the four filter cartridge cleaning embodiment of FIG. 14. The all thread shaft 209 (not shown) turns the drive shaft pulleys 219a and 219b (which is located below pulley 219a). Drive belt 220a b drive shaft pulleys 219a, and turns cartridge rotating disc pulleys 223a and 223b. Drive belt 220b is driven by drive shaft pulleys 219b, and turns cartridge rotating disc pulleys 223c and 223d.

Figure 17:
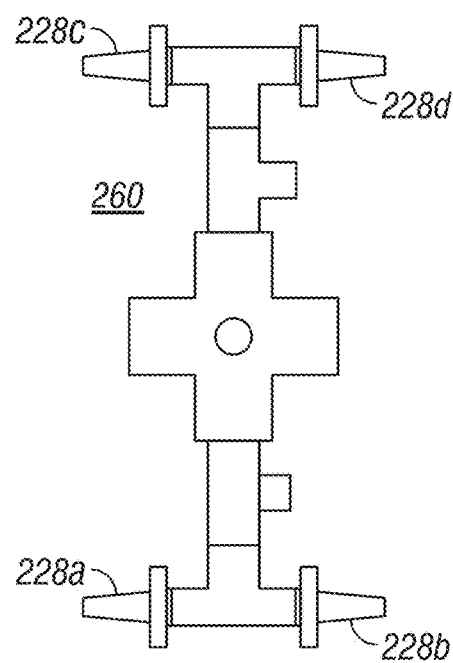
FIG. 17 is a top view of the nozzle array of the four filter cartridge cleaning embodiment of FIG. 14.

FIG. 17 is a top view of the nozzle array 260 of the four filter cartridge cleaning embodiment of FIG. 14. In this example, the nozzle array provides single spray nozzles 228a, 228b, 228c, and 228d for each filter cartridge. In other examples, multiple spray nozzles may be provided for each filter cartridge.

DESCRIPTION OF EMBODIMENT—MULTIPLE FILTER CARTRIDGE CLEANER WITH FLUID DRIVE

In this embodiment, multiple filter cartridge cartridge rotating supports are rotated by pressurized fluid while a nozzle array is driven by fluid pressure.

Figure 13:
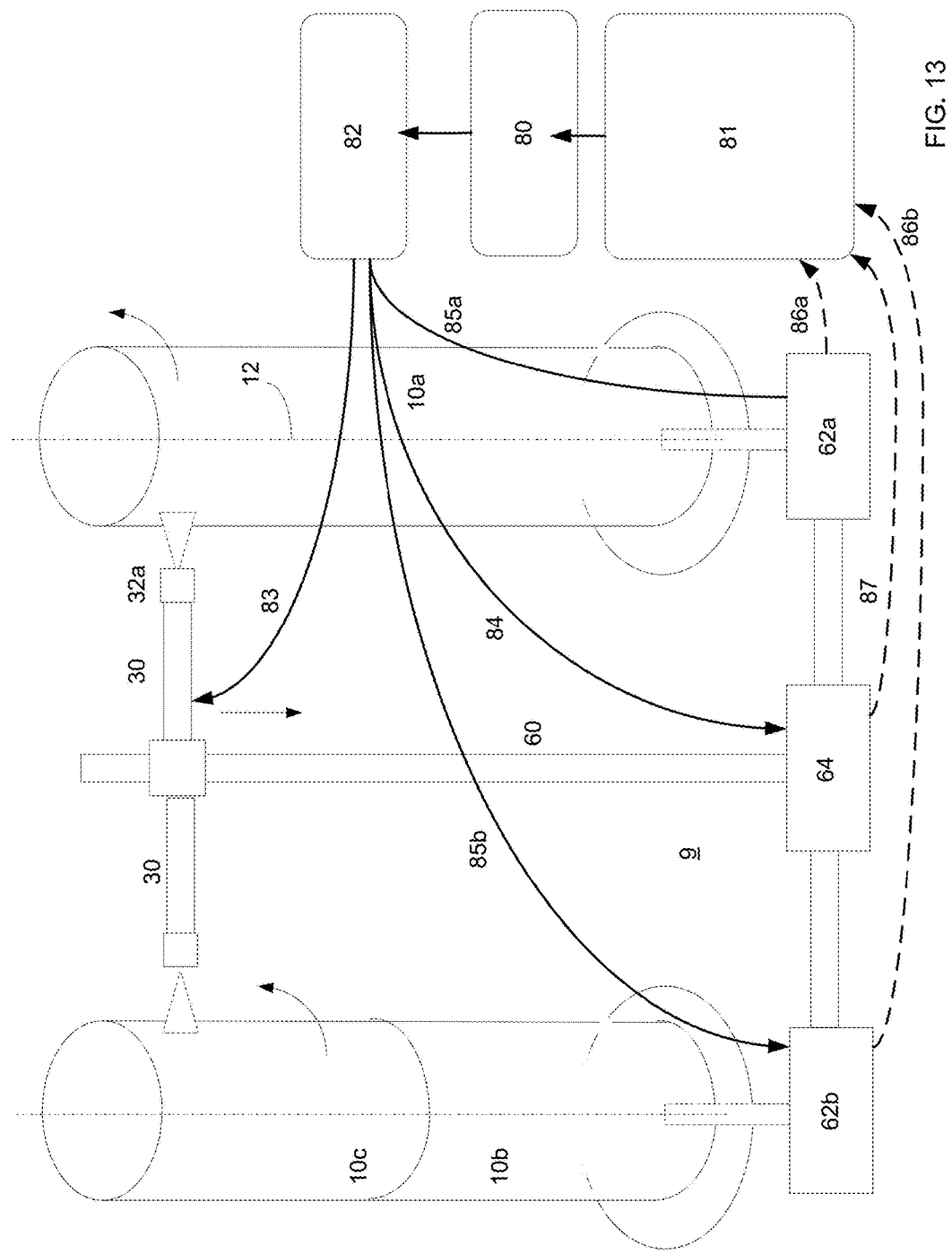
FIG. 13 is a schematic of a vertically-oriented two filter cleaner with fluid powered cartridge rotation and nozzle array movement.

FIG. 13 is a schematic of a vertically-oriented two cartridge filter cleaner 9 with fluid powered cartridge rotation and nozzle array movement. In this embodiment, cartridge filters 10a and 10b are mounted on a cartridge rotating supports 15a and 15b so that the filters' longitudinal axes 12 are vertically-oriented. The cartridge rotating supports are rotated by cartridge rotating support drive elements as described in FIG. 8, and the a nozzle array 30 is moved as described in FIG. 8. In this embodiment, a pump 80 provides water, or a mixture of water and other agents, from reservoir 81 to an optional pressurized tank 82.

Pressurized fluid is provided from the optional pressurized tank 82 or directly from the pump 80 through piping or tubing 83 to the nozzle array 30. The higher fluid pressure from the pump or pressurized tank permits a plurality of nozzles to be used in order to accelerate the cleaning time without sacrificing cleaning effectiveness.

In one example, pressurized fluid is also provided from the optional pressurized tank 82 or directly from the pump 80 through piping or tubing 84 to a cartridge rotating support drive element 64 which can drive a belt or other mechanism to power the cartridge rotating support drive elements 62a and 62b. The fluid used to drive the cartridge rotating support drive element may be returned to reservoir 81 through flow path 87, or may be discharge to the ground or a swimming pool.

In another example, pressurized fluid is provided from the optional pressurized tank 82 or directly from the pump 80 through piping or tubing 85a and 85b to directly drive the cartridge rotating support drive elements 62a and 62b. The fluid used to drive the cartridge rotating support drive elements 62a and 62b may be returned to reservoir 81 through flow paths 86a and 86b, or may be discharge to the ground or a swimming pool.

It is to be understood that the specific embodiments and examples described above are by way of illustration, and not limitation. Various modifications may be made by one of ordinary skill, and the scope of the invention is as defined in the appended claims.

What is claimed is:

1. A portable cartridge filter cleaning device for a cartridge filter having a longitudinal axis and an outside surface, the portable cartridge filter cleaning device comprising:
    a pair of unenclosed spaced apart vertical members configured to serve as a guide for a nozzle array support as the nozzle array support moves up or down relative to the spaced apart parallel vertical members; a pair of wheels such that the wheels are configured to permit unenclosed spaced apart vertical members to be tilted and rolled on the pair of wheels; an electric motor; a nozzle array subassembly comprising
        one or more pressurized nozzles, and
        a nozzle array subassembly support configured to be driven by the electric motor;
    a garden water hose connection in fluid communication with the nozzle array subassembly;
    a cartridge filter bottom rotating support configured to be rotated by the electric motor and to support a vertically-oriented cartridge filter;
    and a cartridge filter bottom rotating support drive element;
    such that the nozzle array subassembly support is configured to move external to the cartridge filter and parallel to the longitudinal axis of the cartridge filter and to spray water from the one or more pressurized nozzles onto the outside surface of the cartridge filter as the cartridge filter bottom rotating support is rotated by the bottom rotating support drive.

2. The portable cartridge filter cleaning device of claim 1, wherein the nozzle array subassembly further comprises two or more nozzles oriented axially with respect to the cartridge filter.

3. The portable cartridge filter cleaning device of claim 1, wherein the nozzle array subassembly further comprises two or more nozzles oriented longitudinally with respect to the cartridge filter.

4. The portable cartridge filter cleaning device of claim 1, further comprising a DC motor; a threaded rod driven by the DC motor, such that the nozzle array subassembly is configured to be driven along the threaded rod; and a belt drive assembly, such that the belt drive assembly is driven by the DC motor, and the belt drive assembly is the cartridge filter bottom rotating support drive element.

* * * * *